(12) United States Patent
Carbonell Madern et al.

(10) Patent No.: US 10,858,772 B2
(45) Date of Patent: Dec. 8, 2020

(54) METHOD FOR LASER ENGRAVING ON CLOTHING AND CORRESPONDING MACHINE

(71) Applicant: JEANOLOGIA, S. L., Paterna Valencia (ES)

(72) Inventors: Josep Maria Carbonell Madern, Sant Quirze del Vallès Barcelona (ES); Albert Sans Perarnau, Sant Quirze del Vallès Barcelona (ES); Ricardo Mira Paya, Sant Quirze del Vallès Barcelona (ES)

(73) Assignee: JEANOLOGIA, S. L., Paterna Valencia (ES)

( * ) Notice: Subject to any disclaimer, the term of this patent is extended or adjusted under 35 U.S.C. 154(b) by 42 days.

(21) Appl. No.: 16/474,689

(22) PCT Filed: Jan. 5, 2018

(86) PCT No.: PCT/IB2018/050077
§ 371 (c)(1),
(2) Date: Jun. 28, 2019

(87) PCT Pub. No.: WO2018/127838
PCT Pub. Date: Jul. 12, 2018

(65) Prior Publication Data
US 2019/0345658 A1    Nov. 14, 2019

(30) Foreign Application Priority Data

Jan. 5, 2017    (EP) .................................... 17382002

(51) Int. Cl.
*D06B 11/00*    (2006.01)
*B23K 26/0622*    (2014.01)
(Continued)

(52) U.S. Cl.
CPC ...... *D06B 11/0096* (2013.01); *B23K 26/0006* (2013.01); *B23K 26/0622* (2015.10);
(Continued)

(58) Field of Classification Search
CPC .... D06B 11/0096; B23K 26/062–0626; B23K 26/0006; D06C 23/02
(Continued)

(56) References Cited

U.S. PATENT DOCUMENTS 5,916,461 A * 6/1999 Costin ................. D06M 10/005
219/121.68
6,002,099 A * 12/1999 Martin ................... D06C 23/02
219/121.69
(Continued)

FOREIGN PATENT DOCUMENTS

EP    3 098 016 A1    11/2016
WO    01/25824 A2    4/2001

OTHER PUBLICATIONS

International Search Report and Written Opinion of the International Searching Authority dated Apr. 16, 2018 in corresponding International application No. PCT/IB2018/050077; 16 pages.

*Primary Examiner* — Nathan E Durham
(74) *Attorney, Agent, or Firm* — Maier & Maier, PLLC (57) ABSTRACT

A method for laser engraving on clothing and to a corresponding machine. Using an image, a laser burns, for each pixel, a corresponding point on the clothing, with a laser energy level that is a function of the pixel value. This function has a first zone with a first average gradient and a second zone with a second average gradient. The first zone corresponds to laser energy values less than the second zone, the absolute value of the second average gradient being greater than the absolute value of the first average gradient. The laser engraving machine comprises a laser source, means for conducting the laser on specific points of the
(Continued)

clothing, means for controlling the energy supplied by the laser, and control means configured to carry out the method.

15 Claims, 7 Drawing Sheets

(51) Int. Cl.
*B23K 26/00* (2014.01)
*B23K 26/06* (2014.01)
*D06C 23/02* (2006.01)
*A41D 1/06* (2006.01)

(52) U.S. Cl.
CPC .......... *B23K 26/0626* (2013.01); *D06C 23/02* (2013.01); *A41D 1/06* (2013.01)

(58) Field of Classification Search
USPC .................................................. 700/130–133
See application file for complete search history.

(56) References Cited

U.S. PATENT DOCUMENTS

| | | | |
|---|---|---|---|
| 6,819,972 B1 | 11/2004 | Martin et al. | |
| 10,051,905 B2 * | 8/2018 | Benefiel | A41H 3/08 |
| 10,470,511 B2 * | 11/2019 | Schultz | D06C 23/00 |
| 2016/0263928 A1 | 9/2016 | Costin, Jr. et al. | |
| 2016/0324234 A1 * | 11/2016 | Hoffman | A41H 3/04 |
| 2018/0049496 A1 * | 2/2018 | Benefiel | B23K 26/352 |
| 2018/0049497 A1 * | 2/2018 | Benefiel | G06K 9/4642 |
| 2018/0066395 A1 * | 3/2018 | Benefiel | A41H 3/007 |
| 2018/0352887 A1 * | 12/2018 | Sights | B23K 26/352 |
| 2019/0021427 A1 * | 1/2019 | Schultz | D06C 23/00 |
| 2019/0307194 A1 * | 10/2019 | Sights | A41H 3/08 |
| 2020/0077727 A1 * | 3/2020 | Sights | D06M 10/005 |

* cited by examiner

METHOD FOR LASER ENGRAVING ON CLOTHING AND CORRESPONDING MACHINE

FIELD

The invention refers to the field of engraving clothing by means of a laser, in particular for fabrics known as jeans, jeanswear or denim, and preferably to produce an appearance of premature aging and to simulate the appearance of used clothing which has become aged in a natural way.

More specifically, the invention refers to a method for laser engraving of clothing using a digital image, in which each pixel of the image has a pixel value lying between a minimum pixel value and a maximum pixel value, and in which for each pixel a laser burns a point in said clothing corresponding to said pixel, with an energy level of the laser which is a function of said pixel value.

The invention also refers to a machine for laser engraving of clothing that comprises a laser source, means for conducting the light emitted by said laser source to specific points of said clothing, and means for controlling the energy provided by said laser.

BACKGROUND

In the field of laser engraving of clothing, especially jeanswear, also known as denim or jeans, there are known solutions, in which a beam of laser light falls onto said clothing so as to eliminate, by combustion, the surface layer of fabric, thus achieving a change in colour.

The system for projecting the laser radiation onto the garment can use a system of deflection mirrors, a plotter, or any other system capable of guiding and focusing the laser beam onto the clothing in order to concentrate the energy in a series of points which will make up the design being engraved.

After the combustion stage, the clothing is subjected to a washing process to eliminate the ashes, after which the now final design appears. Usually, this involves a burning of clothing having a light colour fabric with a darker surface layer of dye, so that the more energy of the laser at a point, the more dye is eliminated and the less dark is the result. That is, low energy values correspond to darker regions, also known as shadows, while high values correspond to less dark regions, also known as lights.

In general, the design is produced by computer drawing tools, or by a digitization of a design by hand. In this, one starts from computer images in which each pixel of the image has a specific value. Since the laser removes material by burning it, colour effects are generally not achieved, so that the pixel value is usually a monochromatic representation of the desired design.

One of the uses of this type of system is to simulate a natural aging of the clothing as a result of use, such that lighter regions appear where there is more wear and darker regions where the wear is smaller. For this type of application, structures are also drawn to simulate wrinkles, etc. The goal is to produce clothing, such as pants, which is new, yet has an aesthetic effect of clothing with a certain amount of wear from use. In the particular case of denim clothing, this effect is highly prized by some users.

In order to achieve these effects, as disclosed in US 2016/263928 A1, it is used a design, in which each pixel corresponds on a point of the clothing and each pixel value is basically a representation of the degree of simulated wear to be obtained by means of the laser engraving.

However, it was quickly discovered that the designs so created had a "flat" and rather unconvincing appearance, and therefore, there are now engraving techniques aimed at overcoming this difficulty. In the current prior art, usually it is used not one, but two images, a first one with the basic shapes and a second one with the effects which need to be exaggerated. This technique is known as double marking. In this way, a more appealing effect, sometimes known as a "3D effect", is achieved. In this context, the use of the term 3D does not really refer to an image which is three-dimensional, but rather it is simply a label used in the industry for this more realistic effect.

Even so, this type of technique has various drawbacks, most notably the fact that it requires a perfect alignment of the clothing between the first pass for the first image and the second. Furthermore, the total time and the energy of the process are increased, since two iterations, and an alignment process are required. Another drawback is that, for each design, the designer needs to be able to create the two images in a coherent manner in order to achieve the desired effect, which demands much practical experience.

All of this makes the process much more expensive, and thus the resulting clothing is more costly.

SUMMARY

The aim of the invention is to provide a method for laser engraving of clothing of the type indicated above, which is able to overcome the aforementioned drawbacks by reducing the final cost of the product and simplifying the design process.

Another object of the invention is a machine for laser engraving of clothing configured to carry out the aforementioned method.

This purpose is achieved by means of a method for laser engraving of clothing of the type indicated above, characterised in that said function has a first region with a first mean gradient and a second region with a second mean gradient, in which said first region corresponds to lower laser energy values than said second region; the absolute value of said second mean gradient being higher than the absolute value of said first mean gradient.

Thus, the low levels of energy follow a first curve with smaller gradient than for high laser energy values. This enhances the effect in the regions that the design specifies a higher laser energy, that is, for the same variation in the pixel value the variation in energy is greater in the second region than in the first region. This refers to mean values, since the gradients might not be constant. This also has the effect that the maximum energy value may be higher than what would have been obtained if the first region had represented the entire function. The skilled person will understand that the laser used needs to be capable of being configured to transmit the required energy level. Preferably, the function is either increasing or decreasing; in the former case, low pixel value levels correspond to low laser energy levels, and high pixel value levels correspond to high laser energy levels. In case of decreasing functions, the reverse is so: low pixel values correspond to high energy values and high pixel values correspond to low energy levels. The skilled person will understand that the above explained will apply to either of the two cases.

In this way, it is achieved a larger variation for high energies, which emphasizes the design in the high lights, and one obtains a more realistic result of said 3D effect with a single image. This simplifies the task of the designer, eliminates the alignment problems, and even the total time and energy required for the engraving are reduced. Less time is needed, because two passes are not necessary. The total energy is also less, among other things, due to the fact that the laser burning effect is more efficient when the point being burned has not cooled down as much as in the case of two passes.

As a result, one obtains a more simple and cost-effective process, with a result close to or even equal to that in the case of the double marking technique.

Based on the invention defined in the main claim, certain preferred embodiments which characteristics are summarized in the dependent claims have been provided.

In one advantageous embodiment, a point of change defining the transition between said first region and said second region is determined. This makes it possible to define a distinct function for each region which is adapted to the characteristics desired for the latter. Likewise, being able to determine a specific point of change facilitates the parametrization of the method, allowing a user to select the behaviour of the effect in a simple manner.

Preferably, said point of change is between 40% and 60% of the maximum pixel value, which has been found by experimental means to produce an advantageous point for the change in trend of the function, achieving a mild effect in the dark regions and a sharper one in the light regions. The skilled person will understand that, given the range of values, the interval given here is the same for increasing or decreasing functions, even though it is the reverse in one case as compared to the other.

Preferably, said second region has a first section with a third mean gradient; and a second section with a fourth mean gradient, in which said second section corresponds to higher laser energy values than said first section, and in which the absolute value of said fourth mean gradient is lower than the absolute value of said third mean gradient. Thus, said second region is, in turn, divided into two sections, each one with distinct mean gradients: the first section, which is the one closest to the first region, has a larger mean gradient; while the second section, corresponding to greater energy values and further away from the first region, has a smaller mean gradient. It has been confirmed by experimentation that the 3D effect turns out to be more convincing when a saturation of the function is produced in the region of higher lights, corresponding to the greater energy values, such that it stops increasing with such a steep gradient, having the consequence of increasing the medium lights, corresponding to medium energy values, without overly burning the high lights. The effect so obtained proves to be more natural and convincing. The skilled person will understand that herein reference is made to mean gradients, so that the function does not necessarily have sections of linear behaviour; thus, in one preferred embodiment of the invention, the portion of the second region bordering on the first region has a smooth, non-linear transition, up to a portion where the gradient is greater. Preferably, the transition between the first section and the second section also comprises a smooth, nonlinear curve. In this way, the general effect appears smoother, without abrupt transitions in behaviour, so that the 3D effect turns out to be more natural and convincing.

Preferably, the transition between said first section and said second section lies between 20% and 35% of the maximum pixel value if said function is monotonically decreasing, or between 65% and 80% of the maximum pixel value if said function is monotonically increasing. It has been confirmed by experiments that this produces a convenient range for the change in mean gradient. The skilled person will understand that said transition is not necessarily a point, but rather it is preferably a region of smooth change between the two sections.

In one advantageous embodiment, it is determined a cut-off point defining a transition between said first region and a third region in which the energy value is zero. Thus, this cut-off point defines a minimum laser energy threshold below which no energy can be transmitted to the point of the clothing. It has been found by experiments that, for very low energy values, the engraving effect is indiscernible to the average person, so that it can even not be engraved if the energy is below said threshold. This results in a higher energy efficiency, given the lower consumption. Preferably, said cut-off point lies between 82% and 90% of the maximum pixel value if said function is monotonically decreasing, or between 10% and 18% of the maximum pixel value if the function is monotonically increasing, these ranges having been obtained through experimentation and observation of results for various energy levels.

Preferably, said function is monotonically decreasing. This entails that low pixel values correspond to high energy values, and vice versa. Thus, the starting image is to a certain extent the negative of the result which is to be achieved. Despite this apparent difficulty, the dark colour of the regions with lower pixel values in the design image is associated with areas more burnt by the laser, resulting in a more advantageous solution for designers who are used to the laser engraving field. Likewise, the fact that the function has a monotonic decrease, that is, at no time does it increase, prevents the appearance of artefacts in the final image, known as solarisations, that is, a local inversion of light and dark regions.

Preferably, said minimum pixel value is 0 and said maximum pixel value is 255. It has been proven by experiments that the ability to differentiate between dark and light shares in the finished clothing is very limited, generally below 200 levels. Thus, the above range enables the representation of the pixel value with a single byte, which is furthermore a very advantageous format for use in monochromatic computer images.

Preferably, in said first region the gradient has a variation lower than 5%. Thus, the effects of nonlinearity of the function are limited in said first region, resulting in a more natural final image. Preferably, said function is a linear function in said first region, which maximizes the above described effect.

In a preferred embodiment, said function has the following form:

for said first region, $$E = E_{max} \frac{V_{max} - p}{V_{max}}$$

for said second region, $$E = E_{max} \left(\frac{V_{max} - p}{V_{max}}\right)\left(1 + H\left(1 + \tanh\left(2 - C\frac{p}{V_T}\right)\right)\right)$$

where:
E, represents the energy level of the laser for the point,
$E_{max}$, represents the maximum energy value of the linear contribution,
$V_{max}$, represents the maximum pixel value, preferably 255, p, represents the pixel value for the point, being p∈[0; $V_{max}$], $V_T$ represents said point of change between said first region and said second region, H represents a factor controlling the hyperbolic contribution, C represents a constant controlling the hyperbolic gradient.

Therefore, the first region is completely linear, while the second region has a linear behaviour and a hyperbolic component based on the hyperbolic tangent. The mixture of both contributions is controlled by the factor represented by H. The structure has been obtained based on experiments with various curves, and it has a smooth integration of the energy levels in the transition between sections and regions such that there are no visible steps in power or intensity. Furthermore, it enables the parametrization of certain values to obtain more or less intense effects without changing the intrinsic form of the function. Thus, distinct values of H and $V_T$ enable more or less intense effects.

Preferably, H has a value lying in the range of 1/3 to 5/3, which gives an approximate energy range between 1.67 and 4.33 times the value $E_{max}$ corresponding to the value which would be obtained if the function were completely linear, such as in the current prior art. The minimum value corresponds to a mild effect, while the maximum value results in a more intense 3D effect. It has been observed by experimentation that values above 5 times $E_{max}$ prove to be too exaggerated. Very high values may result in damages in the clothing. Thus, the above range is particularly advantageous for denim clothing.

Preferably, C has a value of 4, resulting in a gradient which have been experimentally proved to optimize the effect, without turning out to be too intense or too mild. In combination with the values of H described above, there may be a small energy gap at the point of change, yet it has been proven by experiments that this jump is not observable in reality, given the reduced range of colours from light to dark which can be observed on the clothing.

Preferably, said factor controlling the hyperbolic contribution, H, has the following formula:

$$H = \frac{1}{A - B \cdot F}$$

Where:

A and B represent constants, and

F is a predetermined parameter controlling the amount of contribution to the effect, preferably having a value between 1 and 100.

Thus, F represents the "power" of the 3D effect. In this case, it refers to a power in the metaphorical sense, since it does not correspond to a real physical magnitude of the term. Thus, it is possible to determine the amount of the effect with a value in the range of 1 to 100. The type of formulation used means that the dependency is not linear, so that the value of H grows more as F increases. This enables a precise control for low values of F, and a more exaggerated change to high values of F. Therefore, it is suitable if it is intended to determine precisely the amount of the effect when the effect is mild, while for high values it is assumed that this precision is not overly important, but rather that a more exaggerated effect is intended.

Preferably, A has a value of 499/165, B has a value of 4/165, and F has a value between 0 and 100; in which, the method considers it to be a special case when F has a value 0, in which case the same linear formula is used in said second region as for said first region. In this way, it is possible to parametrize the effect by selecting a single parameter: in the case that F is 0, the method does not apply any 3D effect, that is, a pure linear function is used. For the range of F from 1 to 100, more 3D effect is applied progressively, that is, the contribution of the hyperbolic part of the function becomes stronger. The values of A and B are obtained such that, given the range of F, the value of H is in the aforementioned range of 1/3 to 5/3.

In an alternative embodiment, said factor controlling the hyperbolic contribution, H, has the following formula:

$$H = a \cdot F + b$$

Where:

a and b represent constants, and

F is a predetermined parameter controlling the amount of contribution to the effect, preferably having a value between 1 and 100.

Thus, the variation of H with respect to F is linear, allowing a uniform control of the amount of 3D effect for each value of F in the mentioned range.

Preferably, a has a value of 4/297, b has a value of 95/297, and F has a value between 0 and 100; in which, the method considers it to be a special case when F has a value 0, in which case the same linear formula is used in said second region as for said first region. Similar to the previous case, these values are adjusted for the linear dependency of H with respect to F.

Preferably, said laser emits pulses of light having a maximum pulse power and wherein said energy level for each point is obtained by varying at least one parameter among the list of parameters consisting of: the maximum power, the number of pulses and the duration of said pulses. Thus, the use of a pulsed laser enables a precise control of the energy transmitted by the laser at each point of the clothing. For each point, this type of laser emits one or more light pulses, so that the total energy transmitted can be controlled in terms of the maximum power of the pulses. In the case of a single pulse per point, the energy can also be further controlled through the duration of the pulse. If various pulses are emitted for each point, the energy can also be further controlled by selecting the number of pulses to be transmitted. The skilled person will have no problem in selecting some combination of the foregoing options in regard of parameters such as the maximum energy needed and the maximum time dedicated to each point. In the context of this invention, the laser duty cycle is known as the ratio of effective time in which it is active, that is, the percentage of time when light is emitted as compared to the total time of the period. Thus, a duty cycle of 50% means that light is only being emitted half the active time, so that in each period the pulse occupies half of that period.

Preferably, said energy level has the following formula:

$$E = D \cdot P_{max} \cdot T_E$$

where:

E, represents the energy level,

D, represents the duty cycle of the laser, defined as the time fraction in which the laser emits light vs the total exposure time, $T_E$, $P_{max}$, represents the maximum power of the laser pulses, $T_E$, represents the exposure time, being the total time in which the laser emits at least one light pulse on the point.

Thus, a pulsed laser is used with a specific duty cycle, D, corresponding to a non-dimensional value greater than 0 and lower than or equal to 1. Therefore, a value 1 means that for each point on the clothing the laser is emitting a single pulse with duration $T_E$. Preferably, the laser emits a plurality of pulses at each point, so that the duty cycle is lower than 1. This is an advantageous embodiment making it possible to control the energy at the point in terms of the exposure time.

The invention also refers to a machine for laser engraving of clothing of the type indicated above, characterised in that it further comprises control means designed to carry out the method described above.

Preferably, it further comprises user parameter input means comprising at least some of the parameters of the group consisting of:
- the point of change between said first region and said second region;
- the amount of contribution to the effect, being preferably a value comprised between 0 and 100, wherein a value 0 indicates that a linear function is used in said second region, and higher values indicate an increasingly stronger contribution of a nonlinear component to said second region; and
- the cut-off point between said first region and said third region.

Therefore, a simple parametrization of the resulting 3D effect becomes possible, without requiring a lot of technical experience. In the case described, it is only necessary to provide the point at which the 3D effect begins to take place (point of change), the amount of the effect (0: no effect, 1: minimal effect—100: maximum effect), and the starting point from which the energy is low enough for the result not to be perceived, which reduces the consumption as described above. Preferably, the parameter input means comprise a parameter of type of 3D effect. In this way, the manufacturer can create various predetermined pre-sets, in which different values among those described above are combined to offer higher level options, as a non-exclusive example, the input parameter being selectable from among the following pre-sets: mild effect, medium effect, or strong effect. This results in an even more simple input, which frees the user from the need of having technical skills.

The invention also comprises other detailed characteristics illustrated in the detailed specification of one embodiment of the invention and the accompanying figures.

BRIEF DESCRIPTION OF THE DRAWINGS

The advantages and characteristics of the invention will be more apparent from the following description which, without limiting main claim, explains certain preferred embodiments of the invention, referring to the figures.

FIG.

FIG. 1A shows a conventional image having a flat appearance.

FIG. 1B shows the same example of laser engraving in which the 3D effect is observed.

FIG. 2A and 2B show an example of design images for double marking.

DETAILED DESCRIPTION OF EMBODIMENTS OF THE INVENTION

Figure 1A:
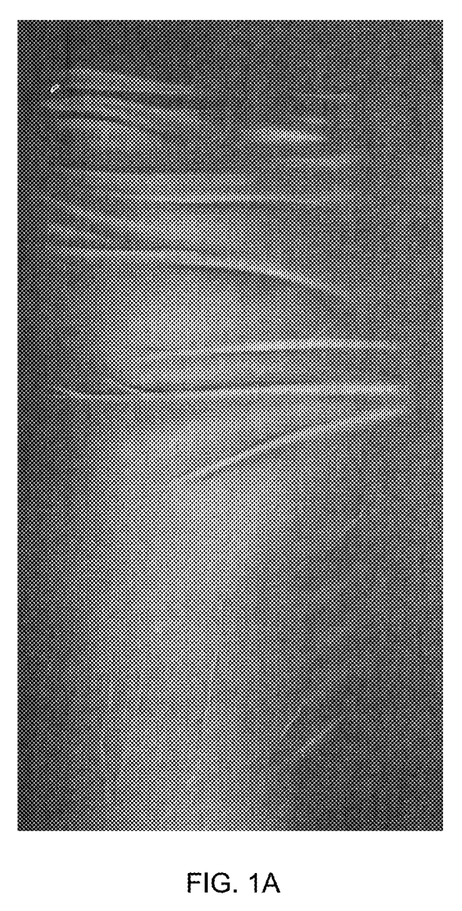
FIG. 1A and FIG. 1B show an example of laser engraving.
Figure 1B:
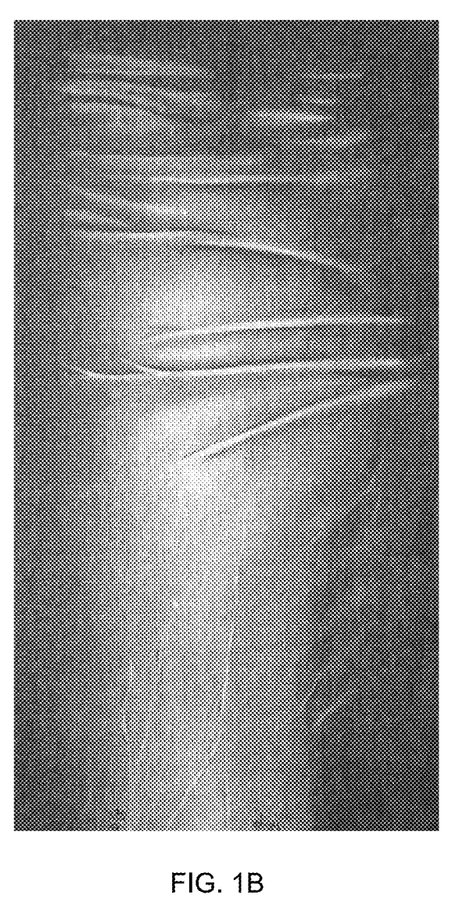
Figure 2A:
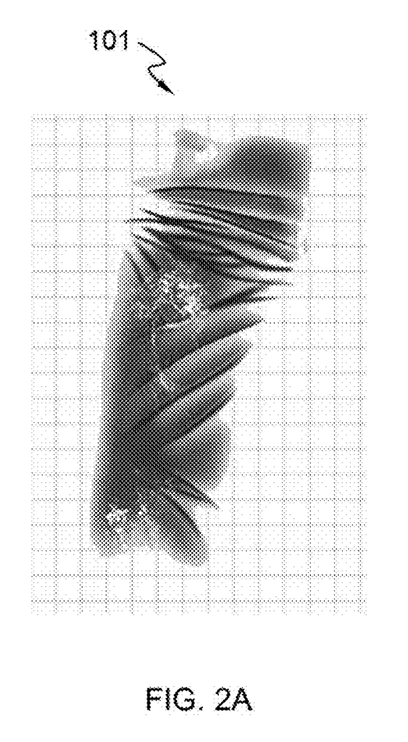
FIG. 2A shows the first basic image.
Figure 2B:
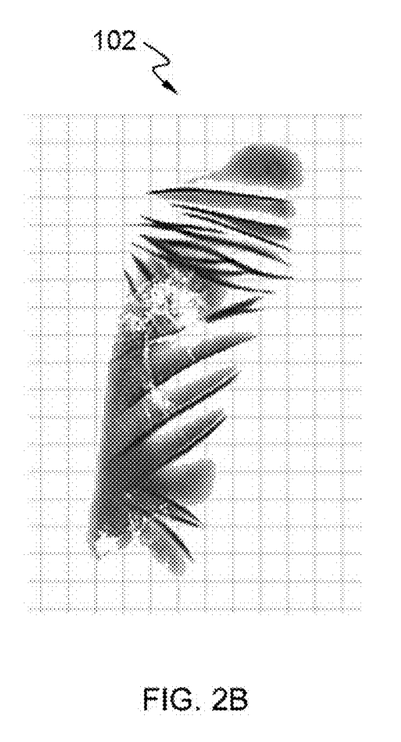
FIG. 2B shows the second image with regions to be emphasized.

FIG. 1A shows an example of engraving on denim clothing, simulating a natural wear. The result obtained has a very flat appearance. FIG. 1B shows the same type of engraving but with the so-called 3D effect. The prior art known for achieving this effect is based on double marking, such that two images are designed which need to be engraved in two passes of the laser so as to be superimposed on and aligned with each other. Thus, in the double marking technique, it is used a first image 101, shown in FIG. 2A, with the general design, and a second image 102, shown in FIG. 2B, with the regions to be highlighted. Note that the images used in FIGS. 2A and 2B are in fact a negative representation wherein the darker pixels correspond to higher laser energy values, and therefore to lighter values in the final result on the clothing.

Figure 3:
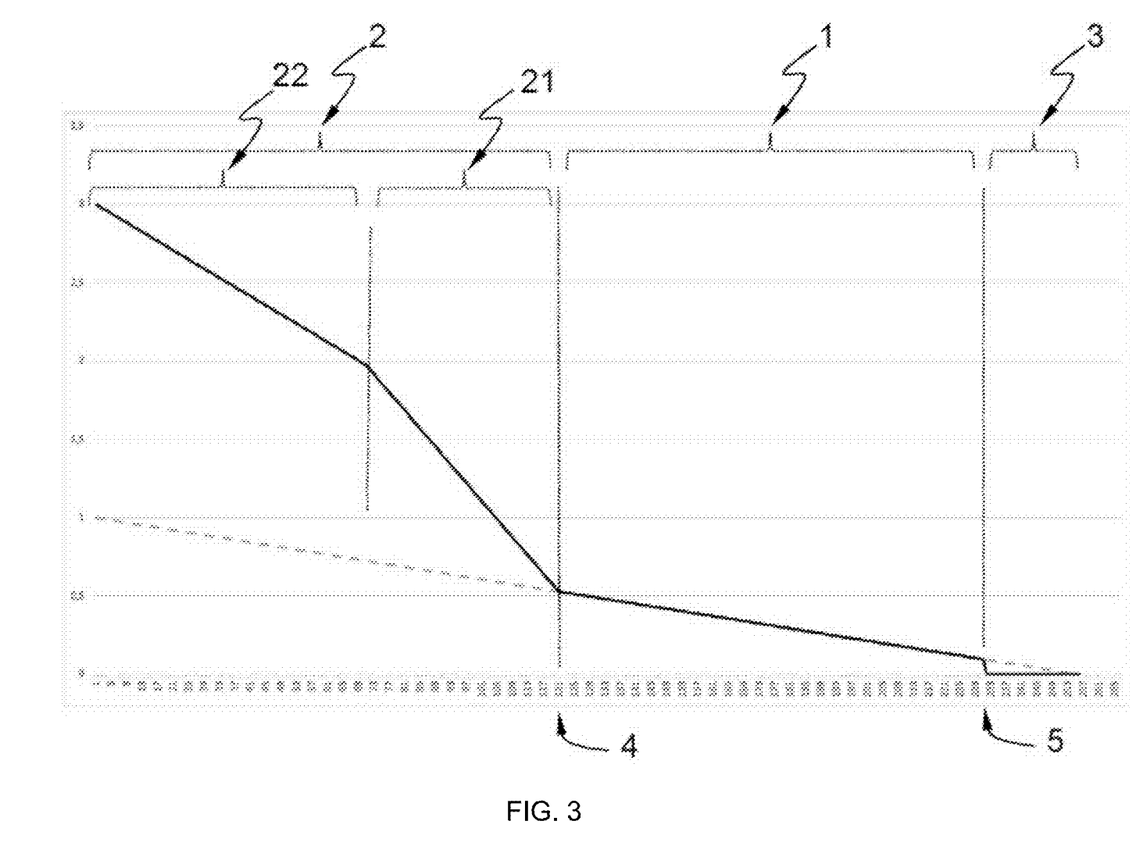
FIG. 3 shows a sample function for one simplified embodiment of the invention.

In order to overcome the drawbacks of the prior art, in one embodiment of the invention shown in FIG. 3 the method for laser engraving of clothing starts with a single digital image 101, comprising pixels with a minimum value of 0 and a maximum value of 255. For each of the pixels of the image 101, a laser burns a corresponding point in the clothing with an energy which is a function of the pixel value. In the case of the examples, the function is monotonically decreasing, such that low pixel values correspond to high lights on the clothing and vice versa. Thus, for the case of the example, the function has three differentiated regions, with a first linear region 1 which is equivalent to what would have been obtained in the current prior art. For reference, FIG. 3 shows by a slanting broken line the reference with regard to the prior art. This same line is shown in FIG. 4A to 4D. For the sake of clarity, and in order to easily understand the relations between the different energies, the maximum energy of the linear component, which would correspond to the current prior art has been normalized to 1 in the figures.

In the case of the example shown in FIG. 3, the function also has a second region 2 with a first section 21 and a second section 22. For the sake of clarity and unless otherwise indicated, when comparing gradients it shall be understood that the absolute value thereof is being compared, not taking into account the sign of the gradient. In the example, the mean gradient of the second region 2 is greater than that of the first region 1. In turn, the gradient of the first section 21 is also greater than that of the second section 22. Finally, the function has a third region 3, where the energy value is zero. The resulting function is monotonically decreasing. Thus, the order of the regions from more to less energy of the laser is: second section 22 of the second region 2, first section 21 of the second region 2, first region 1, third region 3. In the case of the example, except for the third region 3, all sections are linear.

In FIG. 3, the limits of the different regions have been marked by vertical broken lines. In particular, the point of change 4 defining the transition between the first region 1 and the second region 2 is situated at a pixel value corresponding to 120. In turn, the transition between the first section 21 and the second section 22 corresponds to the pixel value 70. Finally, the cut-off point 5 defining the transition between the first region 1 and the third region 3 is at a pixel value of 230.

Figure 4A:
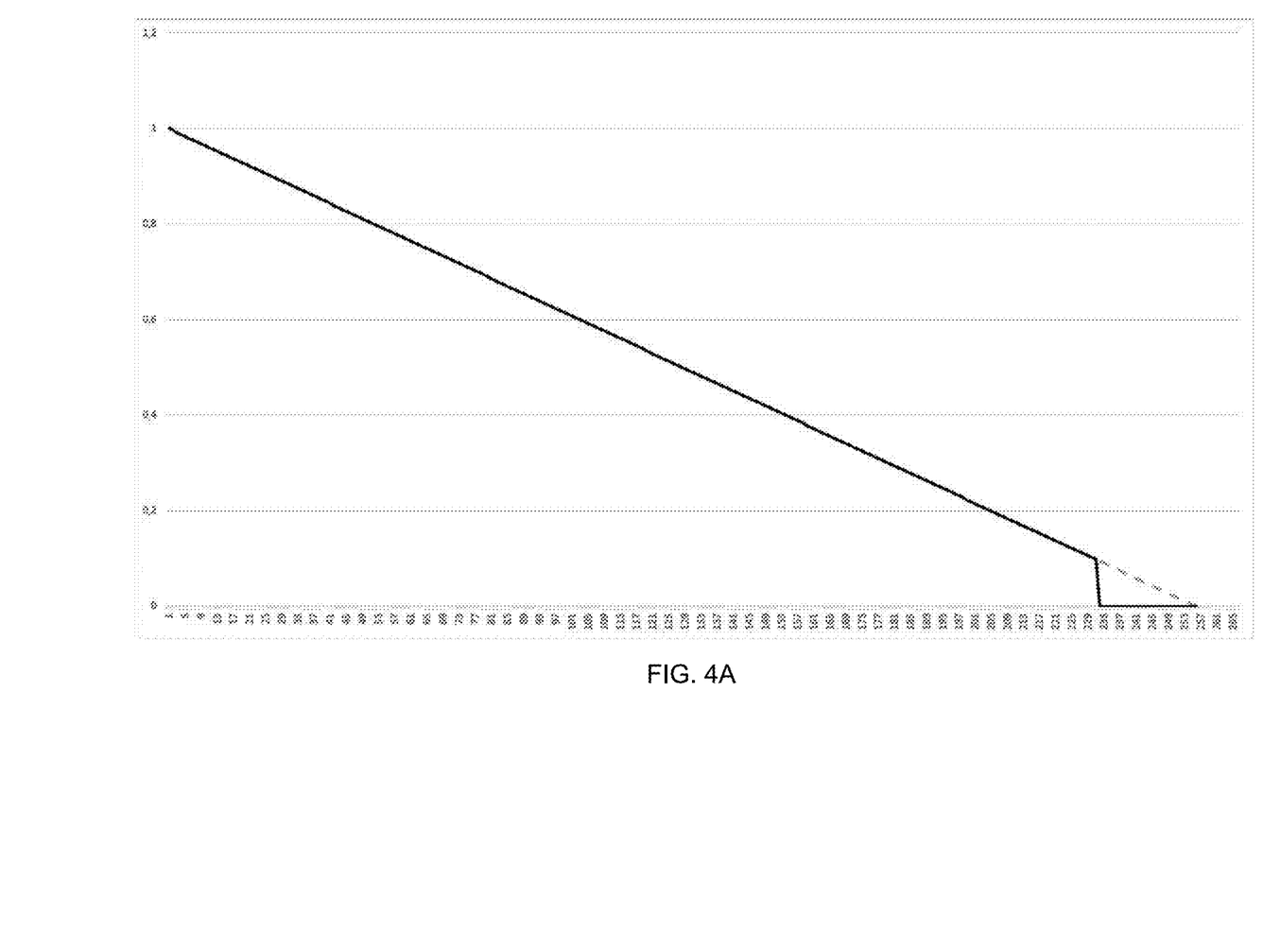
FIG. 4A shows a function for an example of embodiment of the invention, for a value of the parameter F.
Figure 4B:
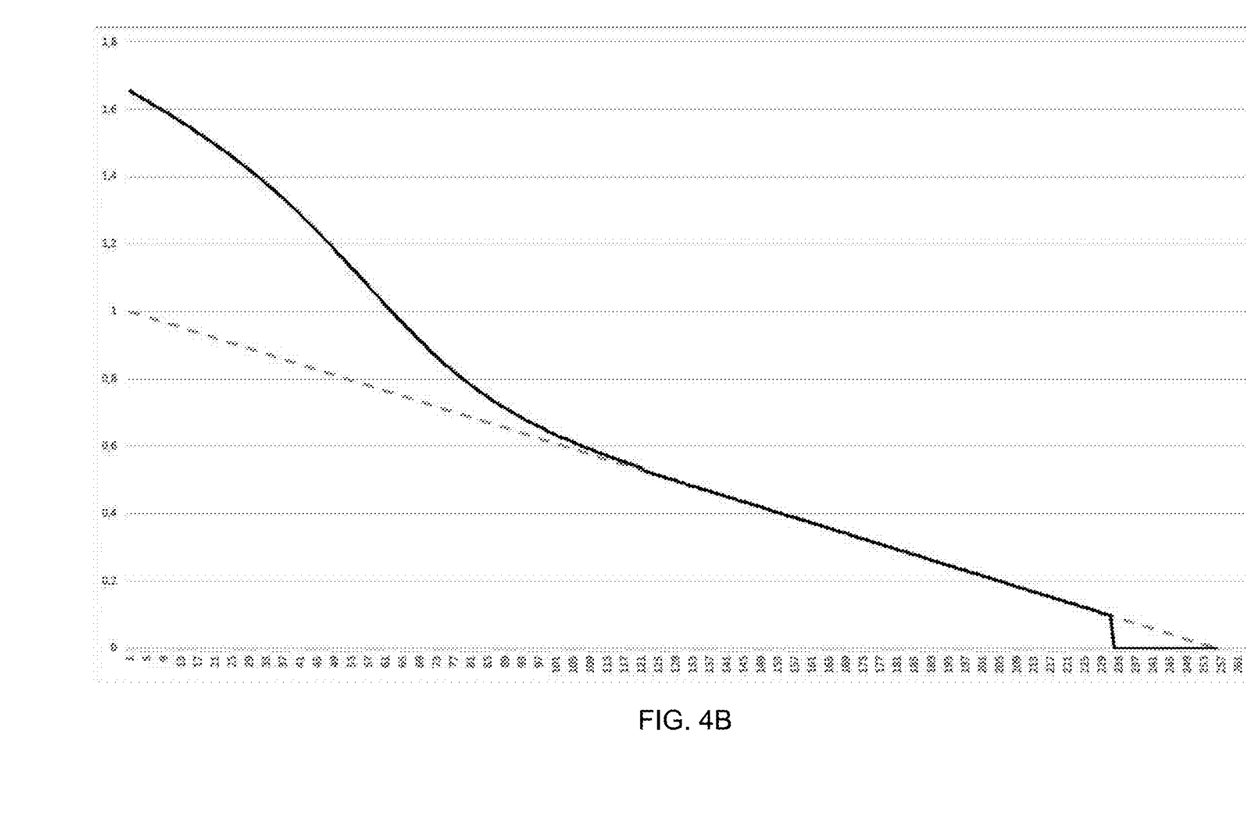
FIG. 4B shows a function for an example of embodiment of the invention, for a value of the parameter F.
Figure 4C:
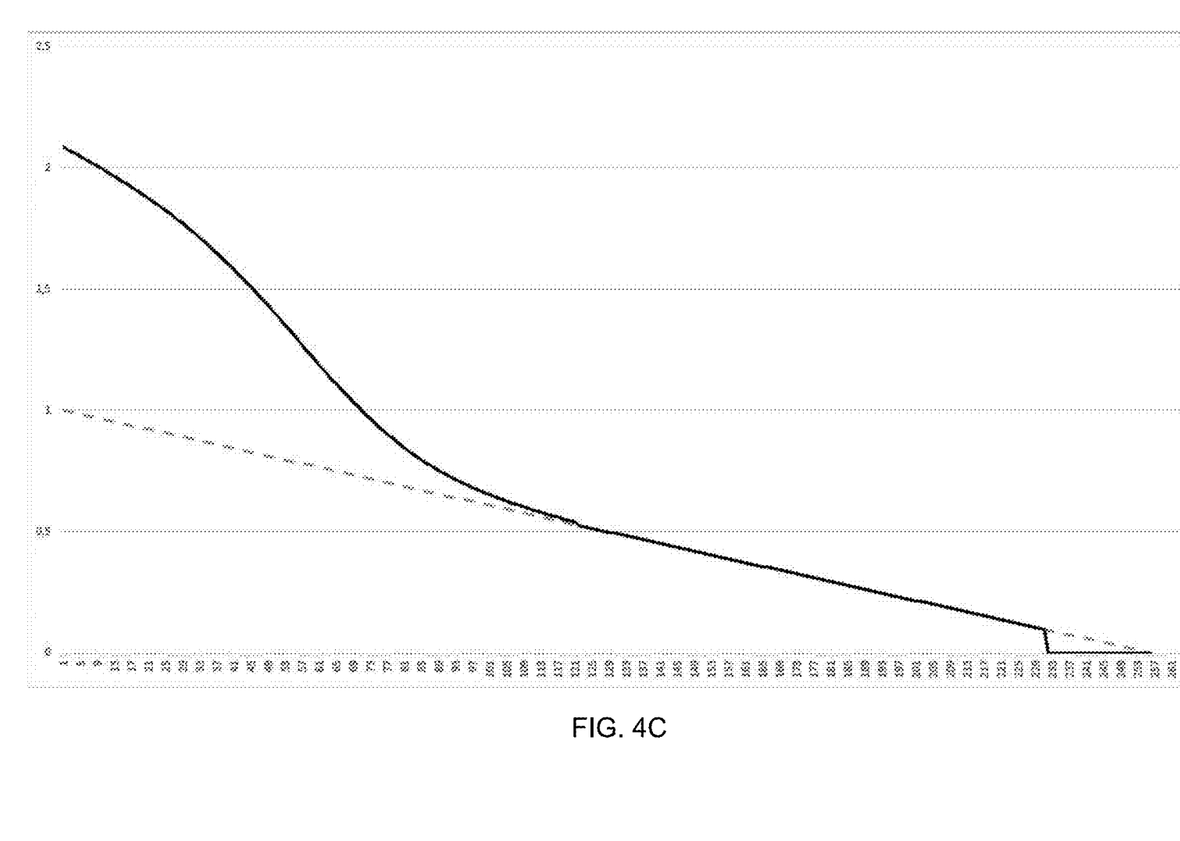
FIG. 4C shows a function for an example of embodiment of the invention, for a value of the parameter F.
Figure 4D:
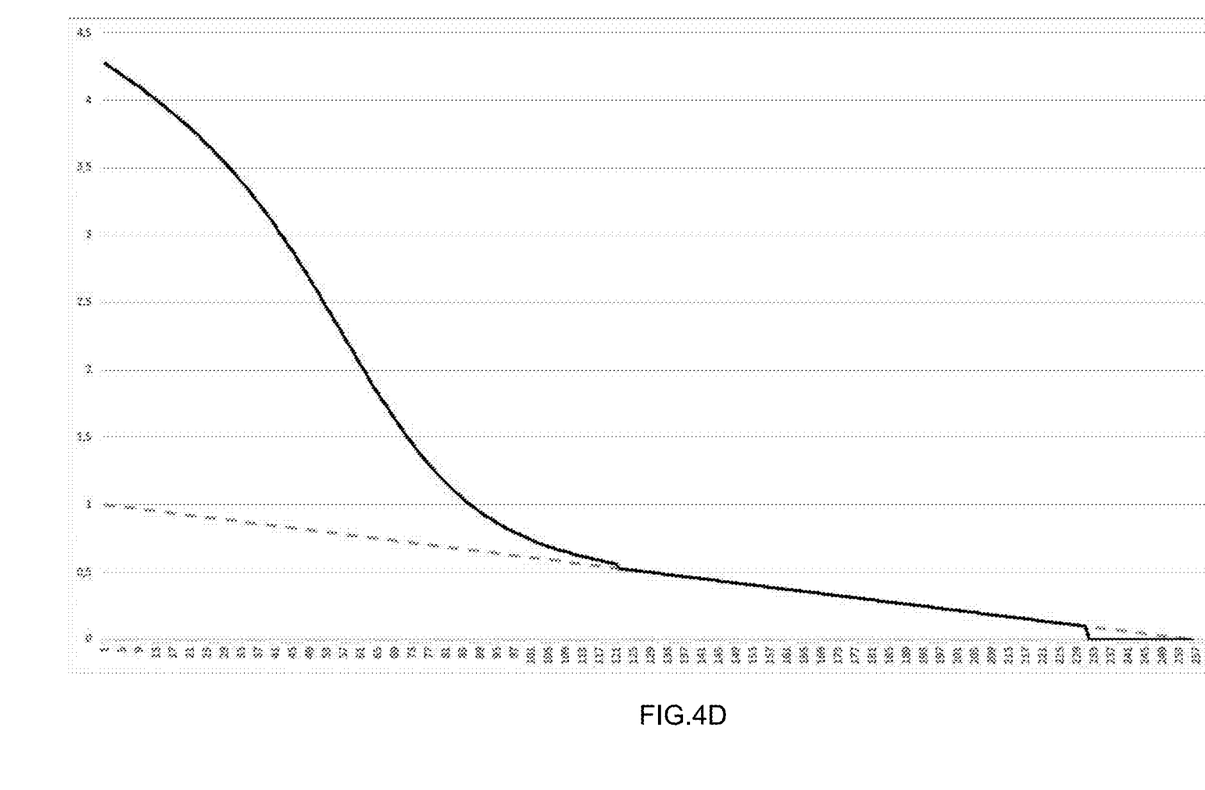
FIG. 4D shows a function for an example of embodiment of the invention, for a value of the parameter F.

FIG. 4A to 4D show another embodiment of the invention. In this example, the function has the following form: for said first region (1), $$E = E_{max} \frac{255 - p}{255}$$

for said second region (2), $$E = E_{max}\left(\frac{255 - p}{255}\right)\left(1 + H\left(1 + \tanh\left(2 - 4\frac{p}{V_T}\right)\right)\right)$$

where:
E, represents the energy level of the laser for the point,
$E_{max}$, represents the maximum energy value of the linear contribution,
p, represents the pixel value for the point, being p∈[0; 255],
$V_T$ represents said point of change (4) between said first region (1) and said second region (2), for this example $V_T$=120 has been chosen.
H represents a factor controlling the hyperbolic contribution, having a range of values between 1/3 and 5/3, For this exemplary embodiment, H has the following formula:

$$H = \frac{165}{499 - 4F}$$

Where F is a predetermined parameter controlling the amount of contribution to the effect, preferably having a value between 1 and 100, or a value of 0 when using a different formulation. In particular, the method of the example considers that if F=0, the second region 2 uses the same formula as described for the first region 1, so that a linear function results in both regions. In FIG. 4A, it may be observed the particular case of the function when F=0. FIG. 4B shows the case of F=1, FIG. 4C shows the case of F=50, and FIG. 4D shows the case of F=100.

In another embodiment, H has the following formula:

$$H = \frac{4F + 95}{297}$$

Where F is equivalent to the previous example. The skilled person will understand that, with this example, it is possible to obtain the same graphics as represented in FIG. 4A to 4D, even though the values of F will be different.

For the embodiments, the machine which performs the engraving comprises a laser light source, with guiding means for the light emitted onto specific points of the clothing where the design is being engraved. It also comprises adequate control means to control the energy being provided by said laser for each point, following the method described above.

In these embodiments, the machine is able to obtain a spatial resolution of 32 dots per inch, with a dot size of around 1.2 mm. The maximum laser energy which can be transmitted to each point is 6.5 mJ.

In the examples, the source involved is a pulsed laser, which emits a series of high-frequency pulses for each point of the clothing, each of them having a maximum pulse power, and with a particular duty cycle. In the case of the examples, the total energy being transmitted is obtained by varying the exposure time in which pulses are emitted for said point. Since selecting a specific time is tantamount to selecting the number of pulses fired during that time, the total energy transmitted to the point is controlled by varying the number of pulses fired by the laser for said point. In other examples, the energy is controlled by varying the maximum power, the duration of said pulses, or a combination of the two.

Thus, the energy level has the following formula:

$$E = D \cdot P_{max} \cdot T_E$$

where:
E, represents the energy level,
D, represents the duty cycle of the laser,
$P_{max}$, represents the maximum power of the laser pulses,
$T_E$, represents the exposure time, being the total time in which the laser is emitting at least one light pulse on the point.

For the previous examples, the method is parametrizable, so that the machine comprises input means for the following parameters:
the point of change 4 between the first region 1 and the second region 2;
the amount of contribution to the effect, F, being a value between 0 and 100, as previously described; and
the cut-off point 5 between said first region 1 and said third region 3.

In other examples, the input means make it possible to select among certain predetermined pre-sets:
Soft mode, selecting $V_T$=120, F=10; corresponding to a more realistic effect between those which the designer sees on the screen and the final result on the clothing;
Medium mode, $V_T$=120, F=25; being the most common value which potentiates the effect of wear and offers a more natural 3D effect;
Strong mode, $V_T$=30, F=75; which for the main part of designs highlights the central part of the image, having an optical effect of thinness at the centre; or
Custom mode, where the user may himself choose the values of $V_T$ and F.

The invention claimed is:

1. Method for laser engraving of clothing, comprising:
starting with a digital image, in which each pixel of the image has a pixel value comprised between a minimum pixel value and a maximum pixel value, and in which for each pixel a laser burns a point in said clothing corresponding to said pixel, with a laser energy level which is a function of said pixel value, wherein said function has a first region with a first mean gradient and a second region with a second mean gradient, in which said first region corresponds to lower laser energy values than said second region; and the absolute value of said second mean gradient is higher than the absolute value of said first mean gradient.

2. Method according to claim 1, wherein a point of change defining the transition between said first region and said second region is determined between 40% and 60% of the maximum pixel value.

3. Method according to claim 2, wherein said function has the following form:

for said first region, $$E = E_{max} \frac{V_{max} - p}{V_{max}}$$

for said second region, $$E = E_{max} \left(\frac{V_{max} - p}{V_{max}}\right)\left(1 + H\left(1 + \tanh\left(2 - C\frac{p}{V_T}\right)\right)\right)$$

where:
E, represents the energy level of the laser for the point,
$E_{max}$, represents the maximum energy value of the linear contribution,
$V_{max}$, represents the maximum pixel value, preferably 255,
p, represents the pixel value for the point, being p ∈[0; $V_{max}$],
$V_T$ represents said point of change between said first region and said second region,
H represents a factor controlling the hyperbolic contribution having a value in the range of 1/3 to 5/3, and
C represents a constant controlling the hyperbolic gradient.

4. Method according to claim 3, wherein said factor controlling the hyperbolic contribution, H, has the following formula:

$$H = \frac{1}{A - B \cdot F}$$

where:
A and B represent constants, and
F is a predetermined parameter controlling the amount of contribution to the effect and having a value comprised between 1 and 100.

5. Method according to claim 4, wherein A has a value of 499/165, B has a value of 4/165, and F has a value between 0 and 100; and when F has a value 0, the same linear formula is used in said second region as for said first region.

6. Method according to claim 3, wherein said factor controlling the hyperbolic contribution, H, has the following formula:

$$H = a \cdot F + b$$

where:
a and b represent constants, and
F is a predetermined parameter controlling the amount of contribution to the effect and having a value comprised between 1 and 100.

7. Method according to claim 6, wherein a has a value of 4/297, b has a value of 95/297, and F has a value between 0 and 100; and when F has a value 0, the same linear formula is used in said second region as for said first region.

8. Method according to claim 1, wherein said second region has a first section with a third mean gradient; and a second section with a fourth mean gradient, wherein said second section corresponds to higher laser energy values than said first section, and wherein the absolute value of said fourth mean gradient is lower than the absolute value of said third mean gradient.

9. Method according to claim 8, wherein the transition between said first section and said second section lies between 20% and 35% of the maximum pixel value if said function is monotonically decreasing, or between 65% and 80% of the maximum pixel value if said function is monotonically increasing.

10. Method according to claim 1, further comprising it is determined a cut-off point defining a transition between said first region and a third region, in which the energy value is zero, and said cut-off point lies between 82% and 90% of the maximum pixel value if said function is monotonically decreasing, or between 10% and 18% of the maximum pixel value if the function is monotonically increasing.

11. Method according to claim 1, wherein said minimum pixel value is 0 and said maximum pixel value is 255, said function being monotonically decreasing, in which in said first region the gradient has a variation lower than 5%, said function being a linear function in said first region.

12. Method according to claim 1, wherein said laser emits pulses of light having a maximum pulse power, and in which said energy level for each point is obtained by varying at least one parameter among the list of parameters consisting of: maximum power, number of pulses and duration of said pulses.

13. Method according to claim 12, wherein said energy level has the following formula:

$$E = D \cdot P_{max} \cdot T_E$$

where:
E, represents the energy level,
D, represents the duty cycle of the laser, defined as the time fraction in which the laser emits light vs the total exposure time, $T_E$,
$P_{max}$, represents the maximum power of laser pulses, and
$T_E$, represents the exposure time, being the total time, in which the laser emits at least one light pulse on the point.

14. Laser engraving machine for clothing, comprising:
a laser source;
conducting means, for conductingthe light emitted by said laser source to specific points of said clothing;
energy controlling means, for controlling energy provided by said laser; and
control means, configured to control said conducting means and said energy controlling means for engraving said clothing, said control means having an energy determination module for determining a laser energy level for each of said points of said clothing;
wherein said energy determination module is configured to use a digital image, in which each pixel of the image has a pixel value, comprised between a minimum pixel value and a maximum pixel value, in which each pixel corresponds to one of said points of said clothing, and determine said laser energy level for each of said points of said clothing as a function of said pixel value in the corresponding pixel of the image;
wherein said function has a first region with a first mean gradient and a second region with a second mean gradient, in which said first region corresponds to lower laser energy values than said second region; and the absolute value of said second mean gradient is higher than the absolute value of said first mean gradient.

15. Machine according to claim 14, further comprising user parameter input means comprising at least one of the parameters:
a point of change between said first region and said second region;
an amount of contribution to the effect, being a value comprised between 0 and 100, in which a value 0 indicates that a linear function is used in said second region, and higher values indicate an increasingly stronger contribution of a nonlinear component to said second region; and a cut-off point between said first region and said third region;

and wherein said energy determination module is further configured to use said at least one parameter to determine said function.

* * * * *